April 30, 1963     H. T. SEELEY     3,088,066
ELECTRIC RECTIFYING AND FILTERING SYSTEM
Filed Dec. 27, 1960

Inventor:
Harold T. Seeley
by Albert S. Richardson Jr.
Attorney.

United States Patent Office 3,088,066
Patented Apr. 30, 1963

3,088,066
ELECTRIC RECTIFYING AND FILTERING SYSTEM
Harold T. Seeley, Lansdowne, Pa., assignor to General Electric Company, a corporation of New York
Filed Dec. 27, 1960, Ser. No. 78,361
12 Claims. (Cl. 321—10)

This invention relates to an electric rectifying system for developing a unipolarity output voltage representative of the amplitude of a single-phase A.-C. input quantity, and more particularly it relates to a rectifying system having a very smooth output voltage, the average magnitude of which changes in high-speed response to sudden variations in the amplitude of the input quantity.

The full-wave rectification of a single-phase A.-C. quantity produces a unipolarity signal having two principal components: a D.-C. component the magnitude of which is the average magnitude of the resultant signal; and a fundamental A.-C. component the frequency of which is twice the frequency of the quantity being rectified. Due to its A.-C. component, the magnitude of the unipolarity signal varies (with time) between successive peaks and valleys, such magnitude variations being known as "ripple."

In many rectifier applications the presence of ripple in the rectified signal is objectionable. For the purpose of removing or at least reducing the ripple, it is conventional practice to utilize appropriate smoothing or filtering means. Most commonly a capacitor is connected across the D.-C. output terminals of a rectifying system to smooth the output signal, the degree of smoothness obtained being determined by the amount of capacitance employed. But the constant voltage characteristic of the shunt capacitor, which enables it to smooth the output signal, also introduces an undesirable delay in the time required for the average magnitude of the output signal to change in response to sudden variations in the amplitude of the A.-C. input quantity. In conventional rectifying systems, fast response is inherently in compromise with ripple reduction.

In order to achieve an improved combination of both smooth output and high-speed response, it has been earlier proposed to "split" the phase of the A.-C. input quantity before rectification. The objective is to supply the rectifying elements of the system with a polyphase A.-C. quantity instead of a single-phase quantity, thereby reducing the magnitude of the ripple in the rectified signal and increasing its frequency. As a result, a smoother output signal is obtained even without the aid of a shunt capacitor, and the speed of response of the system benefits correspondingly. Insofar as I am presently aware, no one has heretofore disclosed practical means for using the phase splitting approach with optimum results, and accordingly, it is a general object of my invention to provide an improved rectifying system incorporating phase splitting means for producing a relatively smooth output signal which is accurately reflective with minimum time delay of any sudden change in amplitude of a single-phase A.-C. input quantity.

Another object of the invention is the provision of a rectifying system which, when supplied with a single-phase A.-C. input quantity, is able to produce a unipolarity signal having a symmetrical ripple of relatively small magnitude, the fundamental ripple frequency being no less than four times the frequency of the input quantity.

Still another object of the present invention is to provide a system which is capable of supplying a load circuit with a rectified signal having a symmetrical ripple the frequency of which is a multiple of twice the frequency of the A.-C. quantity being rectified, the ripple symmetry being independent of the amount of load.

In carrying out my invention in one form, I provide two phase splitting circuits each comprising the series combination of a resistive element and a reactive element. The circuits are connected in parallel circuit relationship between two input terminals for energization by a single-phase A.-C. input quantity, and the elements of each circuit are arranged in appropriate sequence so that there is a significant voltage difference between corresponding intermediate points of the respective circuits. The rectifying system is also provided with a pair of D.-C. output terminals, and these terminals are interconnected with the input terminals by means including at least four diodes arranged in polarity agreement. Connections including two of the four diodes are made from one of the output terminals to the respective intermediate points of the two phase splitting circuits. Balancing impedance means are provided, and the other two diodes in circuit with the balancing impedance means are connected between said one output terminal and the aforesaid two input terminals, respectively.

My invention will be better understood and its various objects and advantages will be more fully appreciated from the following description taken in conjunction with the accompanying drawing in which.

Figure 1:
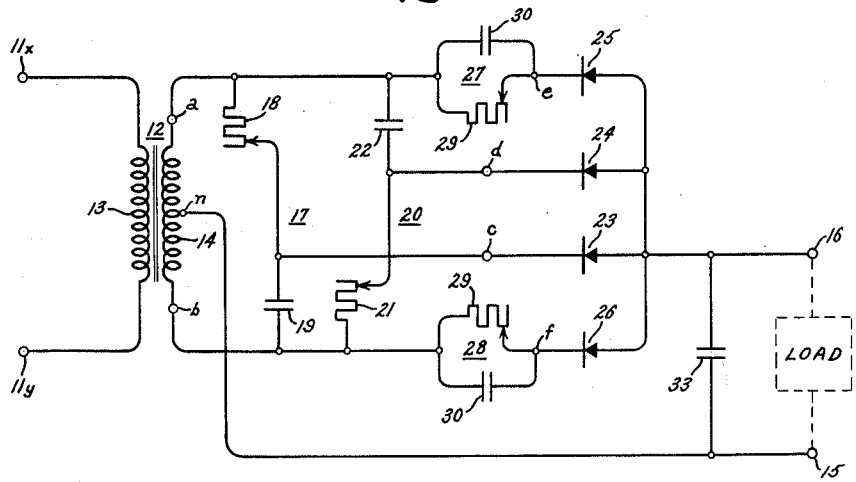
FIG. 1 is a schematic circuit diagram of a rectifying system illustrating a preferred embodiment of my invention.

Referring now to FIG. 1, the rectifying system illustrated therein will be seen to include a pair of input terminals $11x$ and $11y$ which are adapted to be connected to a source (not shown) of alternating current of variable amplitude. In order to accommodate a biphase half-wave arrangement of rectifying elements, the input terminals are connected to suitable voltage dividing means 12. It will become apparent hereinafter that my invention can be practiced with equal success in conjunction with a full-wave rectifier arrangement.

The illustrated voltage dividing means 12 comprises a transformer having two windings 13 and 14 which provide electrical isolation and enable the input magnitude to be changed as desired. The winding 13 is connected between the A.-C. input terminals $11x$ and $11y$. The companion winding 14 is provided with a midtap $n$ substantially half way between its opposite ends, the end terminals of this winding being identified in FIG. 1 by the letters $a$ and $b$. The midcap $n$ is connected directly to one terminal 15 of a pair of output terminals 15 and 16 of the rectifying system.

At least one pair of phase splitting circuits 17 and 20, in parallel circuit relationship, are connected across the transformer winding 14 for energization in accordance with the A.-C. quantity applied to the input terminals $11x$ and $11y$. The phase splitting circuit 17 comprises a resistive element 18, shown in FIG. 1 as an adjustably tapped resistor, and a reactive element 19 to which the resistor 18 is serially joined. The phase splitting circuit 20 comprises a similar series combination of an adjustably tapped resistor 21 and a reactive element 22. Preferably both of the reactive elements 19 and 22 comprise capacitors as shown, although suitable inductances might be used instead. The capacitors 19 and 22 should have equal values of capacitance, and in the illustrated embodiment of the invention the resistors 18 and 21 preferably are adjusted so that the connected resistance of each resistor is approximately equal to the capacitive reactance (at rated frequency) of each of the capacitors 19 and 22. It is apparent, with this particular selection of parameters, that in each of the phase splitting circuits 17 and 20 the voltage drop across the capacitor lags the voltage across winding 14 by 45 electrical degrees, the voltage drop across the resistor leads the same voltage by 45 electrical degrees, and the amplitudes of these two component voltage drops are equal.

As can be clearly seen in FIG. 1, the elements 18 and 19 of the phase spliting circuit 17 are transposed relative to the elements 21 and 22 of the circuit 20. In other words, one of the phase splitting circuits is inverted with respect to the other so that the resistors 18 and 21 of the respective circuits are connected to opposite end terminals $a$ and $b$ of the transformer winding 14. The junction between resistor 18 and capacitor 19 of circuit 17 is connected to a point or terminal identified in FIG. 1 by the letter $c$, while the corresponding resistor-capacitor junction of circuit 20 is connected to a terminal identified by the letter $d$. I arrange the elements of the phase spliting circuits in the particular sequence shown so that there will be a significant voltage difference between the intermediate points $c$ and $d$ of the respective circuits, this voltage being displaced in phase by 90 electrical degrees with respect to the voltage across the transformer winding 14.

The terminals $a$, $b$, $c$ and $d$ are interconnected with the output terminal 16 of the rectifying system by means including four asymmetrically conductive devices 23, 24, 25 and 26, referred to hereinafter as diodes. The four diodes are poled in agreement, that is, they all have like poles connected to the output terminal 16. Diodes 23 and 24 are connected between output terminal 16 and the junction terminals $c$ and $d$, respectively, of the phase splitting circuits. The other two diodes 25 and 26, respectively in series with balancing impedance circuits 27 and 28, are connected between output terminal 16 and the end terminals $a$ and $b$, respectively, of the transformer winding 14. (If the reactive elements 19 and 22 of the phase splitting circuits 17 and 20 were to comprise inductances instead of capacitors, the last-mentioned connection would preferably be made to winding 14 at additional taps located near its opposite ends and the terminals $c$ and $d$ would coincide, respectively, to correspondingly tapped points of the inductances, the various taps being appropriately selected whereby the voltage between the additional taps of the transformer winding and the voltage between the tapped points of the inductances would be equal in amplitude but displaced 90 degrees in phase.)

Figure 2:
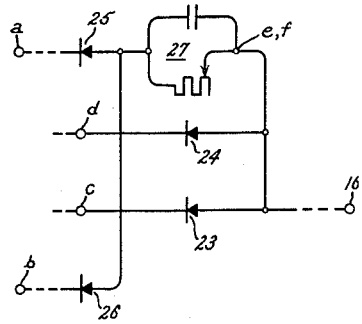
FIG. 2 is a schematic circuit diagram of a modified portion of the FIG. 1 rectifying system to illustrate another embodiment of my invention.

Each of the balancing impedance circuits 27 and 28, as is shown in FIG. 1, comprises the parallel combination of an adjustably tapped resistor 29 and a reactive element 30 of the same kind as elements 19 and 22, namely a capacitor. The output ends of the circuits 27 and 28 are identified in the drawing by the letters $e$ and $f$, respectively. If desired, only one balancing impedance circuit 27 need be used, and it would be connected as shown in FIG. 2 between the output terminal 16 and like poles of the diodes 25 and 26, these two diodes in turn being connected to the end terminals $a$ and $b$, respectively. Ideally the capacitance of the capacitor 30 in each of the balacing impedance circuits 27 and 28 is equal to that of each of the capacitors 19 and 22, and each resistor 29 should be adjusted so that its connected resistance is approximately equal to the capacitive reactance (at rated frequency) of the capacitor 30. Thus, in the preferred embodiment of my invention the resistance of each of the resistors 18, 21 and 29 and the capacitive reactance of each of the capacitors 19, 22 and 30 are selected to be equal to each other.

Figure 3:
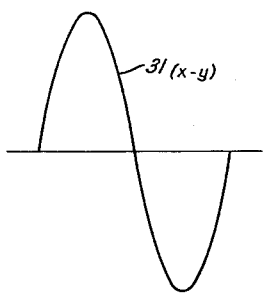
FIGS. 3 and 4 are time-voltage graphs showing the wave forms of the voltages at the input and output ends, respectively, of the rectifying system of FIG. 1.
Figure 4:
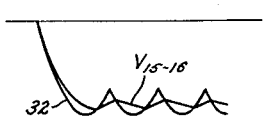

Upon energization of the A.-C. input terminals $11x$ and $11y$, the above-described rectifying system will develop at its D.-C. output terminals 15 and 16 a unipolarity voltage which is representative of the amplitude of the A.-C. input quantity. The wave form of the input quantity, during the initial cycle of energization, has been illustrated in FIG. 3 by the trace identified as $31(x-y)$. For the same cycle of operation, the corresponding rectified voltage of the system is represented in FIG. 4 by the trace identified by the reference number 32. The ripple in the voltage 32, due to the effect of the phase splitting circuits 17 and 20 recurs four times during each cycle of the input quantity. Because of the 90-degree phase relationship obtained between the input voltage (across transformer winding 14) and the voltage across terminals $c$ and $d$, and because of the provision of the balancing impedance circuits 27 and 28 to obtain equivalent impedances behind (on the input side of) each of the terminals $c$, $f$, $d$ and $e$, the ripple in the rectified voltage 32 is symmetrical, that is, successive cycles of the ripple are of equal duration and amplitude. Thus the rectified voltage has no fundamental-frequency or double-frequency A.-C. component. The ripple symmetry will not be affected by changes in the amount of load connected to the output terminals 15 and 16 of the rectifying system.

When additional smoothing is required, a capacitor 33 is connected across the D.-C. output terminals 15 and 16, as is shown in FIG. 1. In this event, the output voltage of the system will appear as shown by the trace $V_{15-16}$ in FIG. 4. Since the elimination of fundamental and double-frequency A.-C. components from the rectified voltage has reduced the amount of shunt capacitance required to reduce the ripple magnitude to any desired value, the capacitor 33 and be relatively small, and it will not seriously encumber the speed of response of the rectifying system to sudden variations in amplitude of the A.-C. input quantity.

Figure 5:
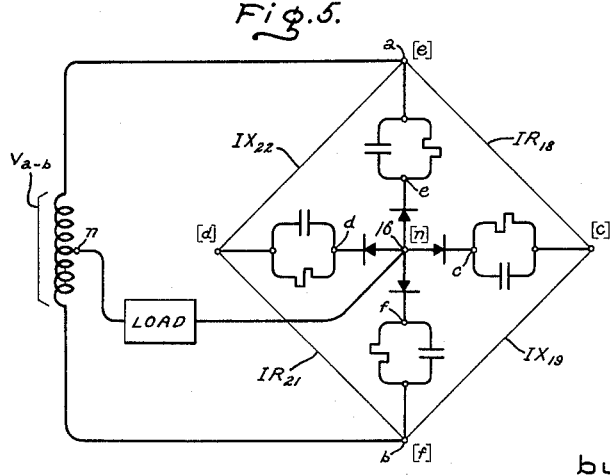
FIG. 5 is a hybrid diagram in which both circuit connections and voltage vectors are shown to aid in a better understanding of my invention.

The manner in which the phase splitting circuits 17 and 20 and the balancing impedance circuits 27 and 28 enable the improved results shown in FIG. 4 to be obtained can best be understood by considering Thevenin's theorem in conjunction with FIG. 5. The unidirectional output voltage of the rectifying system is proportional to the current being supplied to the load impedance connected to the system, and the load current, according to Thevenin's theorem, is equal to the open circuit voltage across the output terminals 15 and 16 (assuming the load to be disconnected) divided by the sum of the load impedance and the impedance between terminals 15 and 16 looking backwards toward the source, all voltage sources being replaced by their internal impedances. Thus, during the intervals when the open-circuit potential of terminal $c$ is more negative than any of the other terminals $a$, $b$ and $d$, load current is equal to the open circuit voltage between terminal $c$ and the midtap $n$ of transformer winding 14 divided by the impedance of the load in series with a circuit comprising resistor 18 in parallel with capacitor 19. Similarly, during the intervals when the open-circuit potential of terminal $d$ is more negative than that of terminal $a$, $b$ or $c$, the load current is equal to the open circuit voltage between terminal $d$ and the midtap $n$ divided by the impedance of the load in series with a circuit comprising resistor 21 connected in parallel with capacitor 22. Whenever the potential of terminal $a$ is more negative than that of terminal $b$, $c$ or $d$, load current is equal to the quotient of the open circuit voltage between terminal $e$ and the midtap $n$ (which is the same as the voltage between terminal $a$ and the midtap) divided by the impedance of the load in series with the balancing impedance circuit 27, and when the terminal $b$ is most negative, the load current is equal to the quotient of the open circuit voltage between terminal $f$ and the midtap $n$ divided by the impedance of the load in series with the balancing impedance circuit 28.

The open circuit voltages between the midtap $n$ and the terminals $c$, $d$, $e$ and $f$, respectively, are all equal in amplitude but displaced 90 degrees from each other in phase. This is shown in FIG. 5 where the line identified as $IR_{18}$ is a vectorial representation of the voltage across the resistor 18, with the load disconnected, the line $IX_{19}$ is a vectorial representation of the open circuit voltage across capacitor 19, the line $IR_{21}$ is a vectorial representation of the open circuit voltage across resistor 21, and the line $IX_{22}$ is a vectorial representation of the open circuit voltage across capacitor 22. Assuming the voltage between terminals $a$ and $b$ to be the reference vector, the open circuit voltages under consideration are seen to be as follows:

$$V_{[n-c]} = \tfrac{1}{2} Va-b \angle -90°$$
$$V_{[n-d]} = \tfrac{1}{2} Va-b \angle +90°$$
$$V_{[n-e]} = \tfrac{1}{2} Va-b \angle 0$$
$$V_{[n-f]} = \tfrac{1}{2} Va-b \angle 180°$$

Since each of the balancing impedance circuits 27 and 28 comprises a parallel combination of a capacitor 30 having the same capacitance as each of the capacitors 19 and 22 and a resistor 29 having the same resistance as each of the resistors 18 and 21, it will be seen that the divisor in each of the four load-current equations is the same. The circuit diagram of FIG. 5 illustrates the ideally balanced condition which is consequently obtained, and it will be apparent that the resulting symmetry of the ripple in the output voltage of my rectifying system is not dependent upon the amount of load impedance connected thereto.

As will be apparent to those skilled in the art, where the transformer 12 of my rectifying system is not needed for purposes of electrical isolation or magnitude changing, an economy may be effected by omitting this component and adding four more diodes arranged, in conjunction with the diodes 23—26, for full wave rectification.

While I have shown and described preferred forms of my invention by way of illustration, many modifications will occur to those skilled in the art. For instance, a second pair of phase splitting circuits could be used with parameters appropriately selected so that a ripple of even smaller magnitude and higher minimum frequency would be obtained. I contemplate, therefore, by the claims which conclude this specification to cover all such modifications as fall within the true spirit and scope of my invention.

What I claim as new and desire to secure by U.S. Letters Patent is:

1. In an electric rectifying system: first and second input terminals adapted to be energized by an A.-C. input quantity; at least one pair of phase splitting circuits, each comprising the series combination of a resistive element and a reactive element, connected in parallel circuit relationship between the input terminals with one of the circuits being inverted with respect to the other; first and second balancing impedance circuits, each comprising the parallel combination of a resistive element and a reactive element, connected to the first and second input terminals, respectively; a pair of output terminals at which a unipolarity output signal is developed upon energization of the input terminals; and means including a plurality of diodes for interconnecting the input terminals and the output terminals, said plurality of diodes comprising first, second, third and fourth diodes having like poles connected to one of the output terminals, said first diode being connected in series with the first balancing impedance circuit between said one output terminal and the first input terminal, said second diode being connected in series with the second balancing impedance circuit between said one output terminal and the second input terminal, said third diode being connected between said one output terminal and an intermediate point of said one phase splitting circuit, said fourth diode being connected between said one output terminal and an intermediate point of said other phase splitting circuit.

2. In an electric rectifying system: first and second A.-C. input terminals; a pair of phase splitting circuits, each comprising a resistor serially joined to a capacitor, connected inversely in parallel circuit relationship between the input terminals; balancing impedance means; a pair of D.-C. output terminals; and means, including at least four diodes arranged in polarity agreement for connecting the input and output terminals, two of said four diodes being connected between one of the output terminals and the resistor-capacitor junctions, respectively, of the phase splitting circuits, and the other two of said four diodes, in circuit with the balancing impedance means, being connected between said one output terminal and the first and second input terminals, respectively.

3. The rectifying system of claim 2 in which the balancing impedance means comprises at least one parallel combination of a resistor and a capacitor.

4. In an electric rectifying system for developing a relatively smooth unipolarity output signal representative of the amplitude of a variable A.-C. input quantity: a transformer having first and second windings, the first winding being adapted to be energized by the A.-C. input quantity; two phase splitting circuits, each comprising the series combination of a resistor and a capacitor, connected in parallel circuit relationship across said second winding with one of the circuits being inverted with respect to the other; two balancing impedance circuits each comprising the parallel combination of a resistor and a capacitor; a pair of output terminals; said second winding and said output terminals being interconnected by means including a plurality of diodes arranged so that the unipolarity output signal is developed at said output terminals upon energization of said first winding, two of said diodes being connected from a first one of said output terminals to the resistor-capacitor junctions, respectively, of said phase splitting circuits, another two of said diodes, in series with said two balancing impedance circuits, respectively, being connected from said first output terminal to opposite ends, respectively, of said second winding; and a smoothing capacitor connected across said output terminals.

5. In an electric rectifying system: a pair of input terminals adapted to be energized in accordance with an A.-C. input quantity; voltage dividing means, provided with a midtap substantially half way between opposite ends thereof, connected across the input terminals; first and second phase splitting circuits connected in parallel circuit relationship across said voltage dividing means, each of said circuits comprising the series combination of a resistive element and a reactive element with the elements of the first circuit being transposed relative to the elements of the second circuit; a plurality of asymmetrically conductive devices; balancing impedance means; a pair of output terminals at which an output signal is developed in response to energization of the input terminals, one of said output terminals being connected to the midtap of said second winding; means including a first two of said conductive devices for connecting the other output terminal of the junctions between the elements comprising said phase splitting circuits, respectively; and means including the balancing impedance means in circuit with a second two of said conductive devices, for connecting the other output terminal to opposite ends, respectively, of said voltage dividing means, said first two devices and said second two devices being poled in agreement so that the output signal developed at said output terminal is unidirectional.

6. In an electric rectifying system for developing a relatively smooth unipolarity output signal representative of the amplitude of a variable A.-C. input quantity: a transformer having first and second windings, the first winding being adapted to be energized by the A.-C. input quantity, the second winding being provided with a midtap substantially half way between opposite ends thereof; at least two phase splitting circuits, each comprising the series combination of a resistive element and a reactive element, connected in parallel circuit relationship across said second winding with one of the circuits being inverted with respect to the other; a plurality of diodes; balancing impedance means; a pair of output terminals at which the unipolarity output signal is developed, one of said output terminals being connected to the midtap of said second winding; means, including two of said diodes arranged in polarity agreement, for interconnecting the other output terminal and the junctions between the elements comprising said phase splitting circuits, respectively; means, including the balancing impedance means in circuit with another two of said diodes arranged in polarity agreement with each other and with said first-mentioned two diodes, for interconnecting the other output terminal and opposite ends, respectively, of said second winding; and a smoothing capacitor connected across the output terminals.

7. In an electric rectifying system: a transformer having first and second windings, the first winding being adapted to be energized by an A.-C. input quantity, the second winding having first and second terminals at opposite ends thereof and being provided with a midtap substantially half way between said first and second terminals; a pair of output terminals at which a unipolarity output signal is developed in response to energization of said first winding, one of said output terminals being connected to the midtap of said second winding; a pair of phase splitting circuits, each comprising a resistor serially joined to a capacitor, connected inversely in parallel circuit relationship between said first and second terminals; a plurality of diodes two of which, in polarity agreement, are connected between the other output terminal and the resistor-capacitor junctions, respectively, of said phase splitting circuits; balancing impedance means; and means, including the balancing impedance means in circuit with another two of said diodes arranged in polarity agreement, for interconnecting said other output terminal and said first and second terminals, respectively.

8. The rectifying system of claim 7 in which the balancing impedance means comprises at least one parallel combination of a resistor and a capacitor.

9. In an electric rectifying system: a transformer having first and second windings, the first winding being adapted to be energized by an A.-C. input quantity, the second winding having first and second terminals at opposite ends thereof and being provided with a midtap substantially half way between said first and second terminals; a pair of output terminals at which a unipolarity output signal is developed in response to energization of said first winding by the A.-C. input quantity, a first one of said output terminals being connected to the midtap of said second winding; a pair of phase splitting circuits, each comprising the series combination of a resistor having a predetermined resistance and a capacitor having a predetermined capacitive reactance, connected inversely in parallel between said first and second terminals; a plurality of diodes having like poles connected to the other one of said output terminals, a first two diodes of said plurality of diodes being respectively connected to the junctions between resistor and capacitor comprising said phase splitting circuits; and a pair of balancing impedance circuits, each comprising the parallel combination of a resistor having said predetermined resistance and a capacitor having said predetermined reactance, one of said balancing impedance circuits being connected between said first terminal and a third diode of said plurality of diodes and the other balancing impedance circuit being connected between said second terminal and a fourth diode of said plurality of diodes.

10. The rectifying system of claim 9 in which the resistance of each of the resistors is approximately equal to the capacitive reactance of each of the capacitors at the rated frequency of the A.-C. input quantity.

11. In an electric rectifying system: first and second A.-C. input terminals; a pair of phase splitting circuits, each comprising a resistive element serially joined to a reactive element, connected in parallel circuit relationship between the input terminals with the elements of each circuit being arranged in such sequence that there is a significant voltage difference between corresponding intermediate points of the respective circuits; balancing impedance means; a pair of D.-C. output terminals; and means, including at least four diodes arranged in polarity agreement for interconnecting the input and output terminals, two of said four diodes being connected between one of the output terminals and said intermediate points, respectively, of the phase splitting circuits, and the other two of said four diodes, in circuit with the balancing impedance means, being connected between said one output terminal and the first and second input terminals, respectively.

12. In an electric rectifying system: first and second A.-C. input terminals; a pair of phase splitting circuits, each comprising a resistive element serially joined to a reactive element, connected in parallel circuit relationship between the input terminals with the elements of each circuit being so sequentially arranged that between intermediate points of the respective circuits there is a significant voltage difference which is displaced in phase approximately 90 electrical degrees with respect to the voltage across the input terminals; balancing impedance means; a pair of D.-C. output terminals; and means including at least four diodes arranged in polarity agreement for interconnecting the input and output terminals, two of said four diodes being connected between one of the output terminals and said intermediate points, respectively, of the phase splitting circuits, and the other two of said four diodes, in circuit with the balancing impedance means, being connected between said one output terminal and the first and second input terminals, respectively.

References Cited in the file of this patent
UNITED STATES PATENTS

| | | |
|---|---|---|
| 2,140,769 | Schienemann | Dec. 20, 1938 |
| 2,497,522 | Walker | Feb. 14, 1950 |

FOREIGN PATENTS

| | | |
|---|---|---|
| 1,073,619 | Germany | Jan. 21, 1960 |